(12) United States Patent
Porter (10) Patent No.: US 12,188,501 B2
(45) Date of Patent: Jan. 7, 2025

(54) CLIP LINKAGE

(71) Applicant: Charles Porter, Blythewood, SC (US)

(72) Inventor: Charles Porter, Blythewood, SC (US)

(*) Notice: Subject to any disclaimer, the term of this patent is extended or adjusted under 35 U.S.C. 154(b) by 234 days.

(21) Appl. No.: 17/806,480

(22) Filed: Jun. 11, 2022

(65) Prior Publication Data

US 2023/0400048 A1    Dec. 14, 2023

(51) Int. Cl.
*F16B 12/26* (2006.01)
*E04F 13/08* (2006.01)

(52) U.S. Cl.
CPC .......... *F16B 12/26* (2013.01); *E04F 13/0812* (2013.01)

(58) Field of Classification Search
CPC .... F16B 12/26; F16B 5/0642; E04F 13/0812; E04F 13/0835; E04F 13/24; E04F 13/0851; E04F 13/0816; E04B 9/225; E04B 9/26

See application file for complete search history.

(56) References Cited

U.S. PATENT DOCUMENTS

| | | | | |
|---|---|---|---|---|
| 4,593,441 A | * | 6/1986 | St. Louis | F16B 5/0614 24/297 |
| 7,627,973 B2 | * | 12/2009 | Lin | G06F 1/1601 24/336 |
| 9,609,964 B1 | * | 4/2017 | Munson | F16M 13/02 |
| 9,665,137 B2 | * | 5/2017 | Chi | G06F 1/187 |
| 2011/0017742 A1 | * | 1/2011 | Sausen | B60H 1/00528 403/345 |

* cited by examiner

Primary Examiner — Gisele D Ford (57) ABSTRACT

A clip linkage is disclosed comprising clips to restrict relative parallel displacement between a panel and a back surface. The clip linkage is set intermediate the panel and the back surface so as to be hidden. The clip linkage is particularly useful for holding a panel to a back surface having a corner such as a corner of a wall or ceiling.

20 Claims, 6 Drawing Sheets

CLIP LINKAGE

FIELD OF THE INVENTION

This invention relates to a clip linkage comprising clips to restrict relative parallel displacement between a panel and a back surface. More specifically it relates to a clip linkage set intermediate the panel and the back surface so as to be hidden. The clip linkage is particularly useful for holding a panel to back surface having a corner such as a corner of a wall or ceiling.

BACKGROUND

In construction of a room, shed, cabin, mobile home, elevator, or vehicle having a wall or ceiling there is often a structural back surface. On this surface may be seen boards, beams, poles, wires and so forth. It is desirable to hide the back surface from view with panel having a finished outer surface. A clip linkage intermediate the back surface and the panel holds the panel in place. Since most walls and ceilings include a corner a clip linkage which allows for easy coverage of the back surface with a panel in corner areas and also the planar areas is desirable.

SUMMARY OF THE INVENTION

According to a first aspect there is a clip linkage to set intermediate a back surface and a panel to restrict their relative parallel displacement, comprising: a first clip comprising a locking arm holder, and a locking arm having a tenon, said locking arm holder attachable to the panel to present a mortice to receive the tenon to restrict displacement of the locking arm parallel to the panel, and said clip linkage comprising a second clip attachable to the back surface to catch the locking arm.

Once the locking arm is caught the by the second clip then the first clip is connected to the second clip. In this way the panel may be prevented or restricted from displacing relative to the back surface.

As the first clip and the second clip may be hidden between the back surface and the panel, the connection between them is tamper resistant.

The locking arm holder may have a first surface by which it is attachable to the panel. The first surface may be an attachment surface in contact with the panel when the locking arm holder is attached to the panel.

The mortice may be presented so as to be accessible by the tenon through a second surface of the locking arm holder. The second surface may face the back surface when the first clip is connected to the second clip so that the clip linkage holds the panel to the back surface. The second surface may be referred to as the back surface facing surface.

According to another aspect there is a clip linkage to set intermediate a back surface and a panel to restrict their relative parallel displacement, comprising: a first clip comprising a locking arm having a tenon and a locking arm holder to attach to the panel to present a mortice in the locking arm holder to receive the tenon and restrict displacement of the locking arm parallel to the panel, and a second clip to attach to the back surface and catch the locking arm.

The locking arm may be prevented or restricted from being pulled out of the locking arm holder. The tenon may conform to the mortice to prevent the locking arm being released from the locking arm holder. Release may be prevented along an elongate and/or longitudinal direction of the locking arm.

The locking arm may be caught by the second arm to prevent the locking arm backing out of the second clip. The second clip may prevent the locking arm from being released by displacement in an elongate and/or longitudinal direction of the locking arm.

The clip linkage may comprise a spacer connectable to the panel and the back surface to permit the panel to move parallel to the back surface as the first clip engages the second clip while holding the panel a distance from the back surface equal the thickness of the first and second clips intermediate the panel and the back surface. The spacer may comprise and insert slidable in a groove or blind hole of the panel. The insert may be connectable to a portion of the panel at an angle or orthogonal to a portion of the panel to which the locking arm holder attaches. The portion of the panel to which the insert attaches may be connected to the portion to which the locking arm holder attaches so that there are two connected panels. The may first panel to which the locking arm holder attaches and a second panel to which the space attaches. The clip linkage may be useful for using orthogonally connected panels to cover a back surface with an orthogonal corner. For example the clip linkage may be used in a room having walls with square corners.

The insert may slidable in a blind cavity of the panel to clamp the first and second clips intermediate the back surface and the panel which screens the insert.

The mortice may have an entrance to receive the tenon opposite to a side of the locking arm holder which attaches to the panel. The locking arm holder is attachable to the panel to direct an entrance to the mortice outward from the panel to drop the tenon into the mortice. Thus the locking arm holder can be attached to the panel before the locking arms are dropped into the locking arm holder. The mortice may have an entrance to receive the locking arm holder normal to the locking arm holder attachment surface so that the tenon does not require bracing by the back surface.

The locking arm may comprise a portion intermediate the first end and the second end which is resilient to bend toward the panel then spring back toward the back surface to engage with the catch. The portion may have a form of a prong or a tine and may extend from the tenon.

The mortice may have converging sides with converge toward an exit for the elongate locking arm. The converging sides restrain the locking arm from being displaced toward the exit. There may be extending from the mortice a first slot in the locking arm holder. The converging sides may merge with sides of the first slot. The sides of the first slot may conform to the locking arm elongate shape. They may conform to a shape of an elongate prong or tine extending from the tenon. This aids the clip linkage to prevent the panel moving relative to the back surface in the longitudinal direction of the locking arm.

The first slot may be elongate to conform to prong tine of the locking arm. The first slot may have sides to prevent lateral deflection of the locking arm parallel to the panel.

This aids the clip linkage to prevent displacement of the panel laterally from the longitudinal direction of the locking arm.

The first slot may have an entrance to receive the locking arm opposite to a side of the locking arm holder which attaches to the panel. The slot may have a depth greater than a thickness of the locking arm save for the tenon to permit the locking arm the held by the tenon in the mortice to bend away from the panel within the slot when the locking arm holder is attached. The tine or prong may protrude from the locking arm holder, and in particular the prong may protrude from the mortice or first slot.

The locking arm holder may comprise an overhang having one of the sides of the elongate slot and/or the mortice. The overhang may protrude form a portion of the locking arm comprising the mortice, and/or the overhang may protrude from portion of the locking arm having an attachment surface to attach the panel.

The second clip may have a cavity entrance to receive the overhang. The overhang may rest on an edge or lip or ledge or crest of the cavity entrance. The edge or lip or ledge or crest may support the overhang. The overhang is part of the locking arm holder which may be attached to the panel. The edge or lip of the cavity entrance is part of the second clip which may be attached to the back surface. Weight of the panel is supported on the edge or lip by the overhang resting on the lip or edge. Since the edge or lip is held in place by the second clip being attached to the back surface, the panel is prevented from dropping away from the back surface.

The locking arm holder may comprise the overhang beside a first slot out of the mortice to receive the locking arm, and the second clip may comprise a ledge, lip or crest for the overhang to rest upon to support weight of the panel. The ledge may be configured to catch the locking arm to prevent longitudinal release. This provides for an uncomplicated and reliable clip linkage in which a ledge, lip, or crest of the second clip prevents longitudinal movement of the panel in the direction of the locking arm and supports the weight of the panel. The ledge, lip, or crest may be of one height or various heights.

The overhang may comprise a weight bearing surface to rest on the cavity entrance intermediate a surface to slide against the back surface and an attachment surface of the locking arm holder to attach to the panel. This aids the overhang to be in the proper position for the clip linkage to clip together without lifting and dropping the panel. Further toward this objective the weight bearing surface may have a height from the attachment surface exceeding a height from a panel facing surface of the second clip of a crest of a cavity entrance to receive the overhang. The crest may be also clip to the locking arm. This aids the locking arm to clip to the second clip without lifting and dropping the panel.

Release of the locking arm from the looking arm holder may be prevented by proximity of the back surface to the locking arm. The locking arm holder presents a mortice in the locking arm holder to receive the tenon through a back surface facing surface when the first clip is connected to the second clip. Release of the locking arm from the second clip may be prevented by proximity of the back surface to an edge or lip or ledge or crest upon which the locking arm is caught.

There may be restricted displacement of the locking arm parallel to the panel when the first and second clip are connected together and when the locking arm holder slides parallel to the back surface to connect the first and second clip together.

The first clip may comprise a second locking arm identical to the first locking arm and a second slot in the locking arm holder aligned parallel to the first slot. The seconds slot may extend from a second mortice in the locking arm holder to hold the locking arms as a fork from the locking arm holder.

The tenon may have a thickness at least a depth of the mortice in locking arm holder to stand the tenon held by the mortice flush or proud of locking arm holder. This braces or clamps the tenon against the back surface. The tenon may a thickness equal to or less than a depth of the mortice. This cradles the tenon within the mortice and allow the locking arm holder to slide along the back surface.

The locking arm may have a second side to slide along the back surface opposite a first side to stand upon the locking arm holder. The second side may be opposite to a first side of the locking arm holder to attach to the panel.

The locking arm may have a thickness less than a depth of a slot into the locking arm holder into which the locking arm is insertable, especially the thickness of a prong extending from the mortice may be less. This allows the locking arm, especially the prong to bend the slot toward the back surface.

The first clip may have a thickness across the locking arm holder and the locking arm substantially equal to a thickness of the second clip to separate the back surface from the panel. The second clip may comprise a first side to attach to the back surface and a second side to slide along the panel.

The locking arm holder and locking arm may have complementary shapes wherein the slot and/or mortice conform to the prong and tenon respectively. The prong by be straight. The locking arm may curve as an arc toward or away from the back surface when the locking arm is clamped between the locking arm holder and back surface or an end of the locking arm his held in the locking arm holder. The locking arm may have a type of L shape cross section, where the base of the L corresponds to the first end. The locking arm may be thickest in the direction standing from the locking arm holder at the first end.

The locking arm may comprise a second end to engage the catch opposite a first end comprising a tenon to prevent the locking arm being displaced from the locking arm holder in a longitudinal direction. Thus the locking arm may comprise a first end to be received and held by the locking arm holder opposite a second end to engage with the catch. The first end may stand under, flush with, or proud of the locking arm holder where the first end is received and held by the locking arm holder.

The first end may comprise the tenon. The locking arm may comprise a second end to engage with the catch distal from where the locking arm is intended to be received and held by the locking arm holder. The locking arm may comprise a barb to engage the catch. The first end and or tenon may be received and held by the locking arm holder distal from a second end comprising a barb to engage with the catch. The barb may be resilient to bend toward a longitudinal portion of the locking arm then spring back to engage with the catch.

The locking arm holder may have a third side for the locking arm to stand upon opposite a first side of the locking arm holder to attach to the panel. The locking arm may stand in a slot to receive the locking arm opposite to the first side of the locking arm holder. The second clip may comprise a catch to catch the locking arm intermediate first and second sides to separate the back surface from the panel.

The catch may comprise a deflector to redirect longitudinal movement of the free end of the locking arm toward the back surface as the clips are connecting. The deflector may have a rim of a catch which the free end may pass over to spring back toward the panel. The deflector may bend the locking arm as the free end is displaced. The deflector may be a ramp sloped to bend the locking arm away from the panel to toward the back surface. The ramp may slope to a rim of a cavity to capture the locking arm. Locking arm holder may hold the locking arm to locate a distal second end the locking arm at a level below the rim with respect to a first side of the locking arm holder to attach to the panel. The catch, deflector, and or ramp may have a leading edge to be set normal to the longitudinal direction of the locking arm and or slot the clips are clipped together. The deflector or ramp may be directed toward the longitudinal direction of the locking arm when attached to the locking arm holder. The a ramp sloped with respect to a second side of the second clip to slide along the panel and a first side to attach to the back surface.

The locking arm may comprise a barb to slide up the ramp as the locking arm bends. The barb may be snapped into the cavity as the locking arm springs back from bending. The first clip may a maximum thickness across the locking arm held in the locking arm holder in a direction to stand from the panel which exceeds a maximum thickness across the rim and a barbed end of the locking arm. The provides a clearance space for the barb between the rim back surface.

According to another aspect there is a panel assembly comprising: the panel and the clip linkage intermediate the back surface, wherein the first clip is attached by the locking arm holder to a hidden surface of the panel facing the back surface, the second clip is attached to the back surface, and the locking arm is held by the locking arm holder and caught be the second clip to restrict to restrict relative parallel displacement of the panel relative to the back surface.

In the panel assembly the clip linkage may comprise a spacer connected to the panel and the back surface to restrict relative displacement between the panel and back surface to parallel displacement. The spacer may comprise an insert slidable in a groove or blind hole of the panel. The panel may comprise a first planar section to which the locking arm holder is attached and a second planar section to which the spacer is slidably connected. The first planar section may be restricted from relative parallel displacement with a portion of the back surface to which the second clip is attached by catchment together of the first clip to the second clip. The second planar section may be restricted from relative parallel displacement with a portion of the back surface parallel to the second portion to which the spacer is connected. The first planar section may be connected to the second planar section by a rigid corner, or the first and second planar sections may be connected by a hinge or other variable angle device. The first planar section may be angled or orthogonal to the second planar section.

According to a another aspect there is a method of setting the clip linkage, comprising: attaching the first clip to the panel by attaching the locking arm holder to the panel to present the mortice in the locking arm holder to receive the tenon, attaching a second clip to the back surface, and displacing the panel parallel to the back surface in a direction from the tenon to a prong of the locking arm to catch the second clip until the second clip catches the locking arm.

According to a another aspect there is a kit of components comprising the clip linkage including the first clip and the second clip. The kit of components may also comprise a spacer connected to the panel and the back surface to restrict relative displacement between the panel and back surface to parallel displacement. The spacer may comprise an insert which is insertable into a groove or blind hole of the panel.

According to another aspect there is a room, shed, cabin, mobile home, elevator, or vehicle having a wall or ceiling comprising a panel assembly.

The invention will now be described, by way of example only, with reference to the accompanying figures in which:

DETAILED DESCRIPTION OF THE INVENTION

Figure 1:
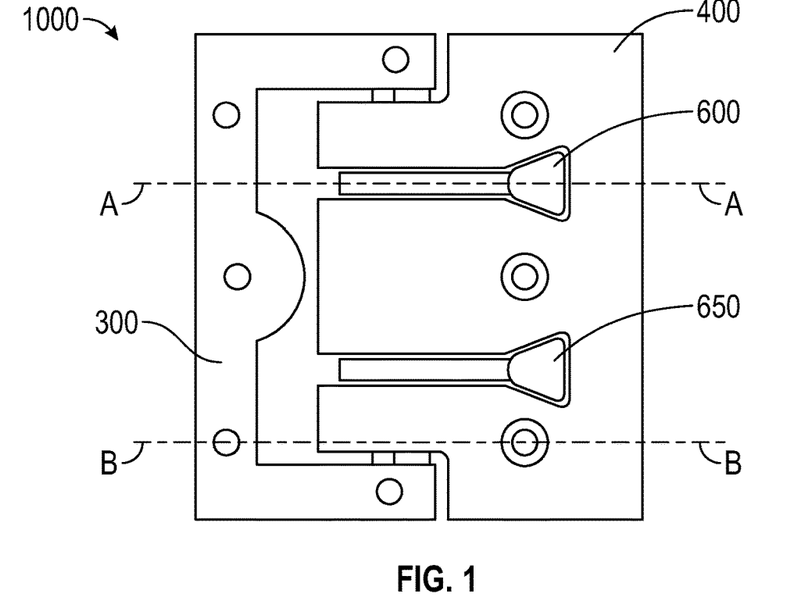
FIG. 1 shows a plan view of a clip linkage of connected clips together to secure a back surface to a panel.
Figure 2:
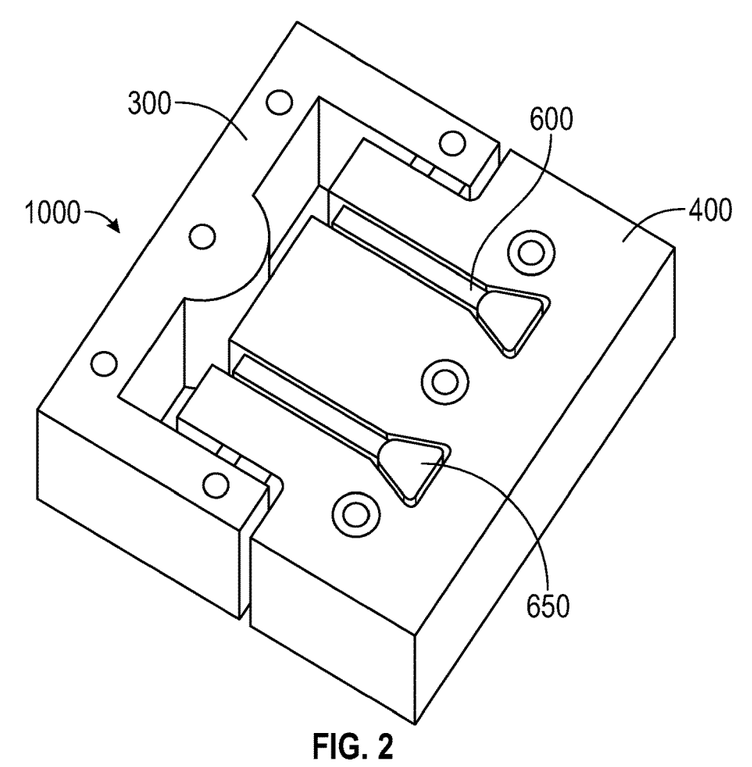
FIG. 2 shows a perspective view of the clip linkage.

Referring to the Figures there is shown in FIG. 1 clip linkage 1000 looking at a side which connects to a back surface. FIG. 2 shows a perspective view of the clip linkage 1000.

The clip linkage comprises a locking arm holder 400. The clip linkage in FIG. 1 and FIG. 2 is shown comprising two locking arms 600, 650 which are held in the looking arm holder 400. However there could be just one locking arm or there could be three or more locking arms and the clip linkage 1000 would still function. The clip linkage comprises a second clip 300.

Figure 3:
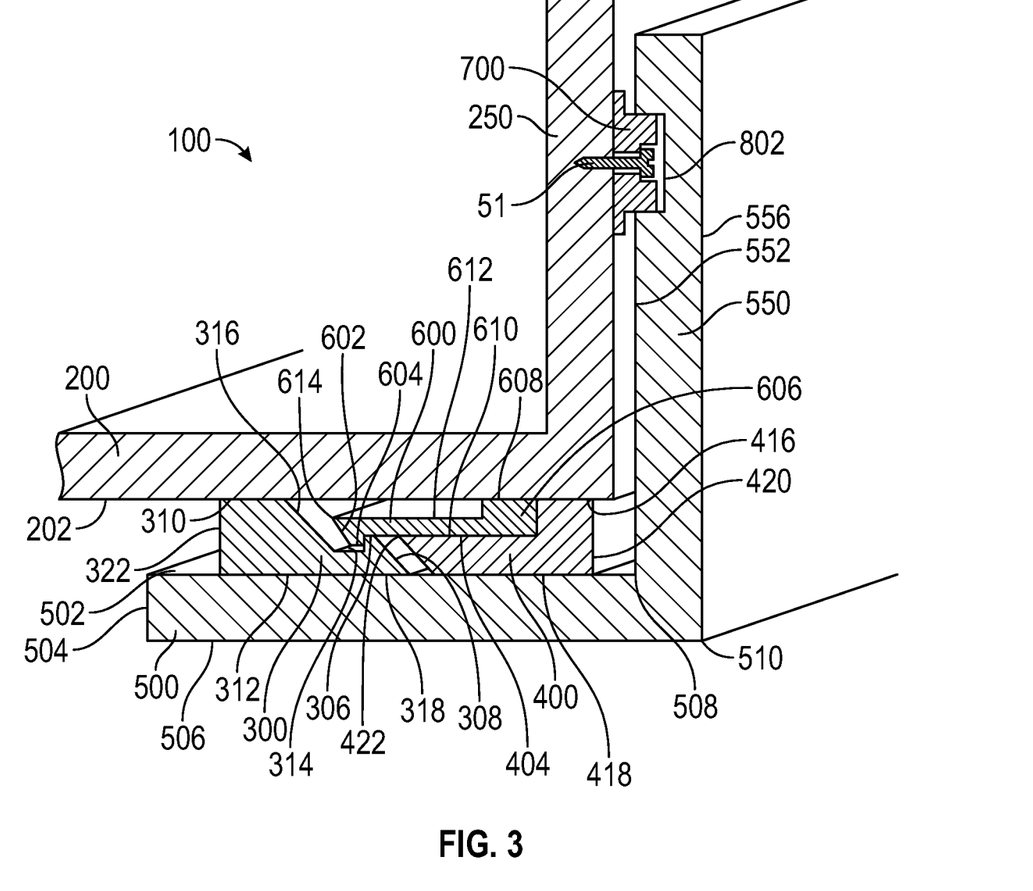
FIG. 3 shows the clip linkage in situ together intermediate a back surface and a panel secured to the back surface by the clip linkage.

There is shown in FIG. 3 a panel assembly 100. The panel assembly is located at a corner of a wall. An advantage of the clip linkage 1000 is its ability to hold a first panel having a corner 508, 510 to a wall or back surface 202 having a corner.

The panel assembly comprises the first panel 500 and the clip linkage 1000 comprising the locking arm holder 400, locking arm 600, and the second clip 300.

To attach the first panel 500 the back surface the first panel 500 is shifted in the longitudinal direction of the locking arm 600. The first panel 500 remains parallel to the back surface 202 and the distance between the first panel 500 and back surface 202 does not change. There is no need to lift and drop the first panel 500 relative to the back surface to clip the locking arm 600 together to the second clip 300. More information on this is described below in a description of FIGS. 8, 9, and 10.

The panel assembly shown in FIG. 3 also comprises a second panel 550 and a spacer 700. The second panel 550 is connected to the first panel 500 at the corner 508, 510. The second panel 550 is orthogonal to the first panel 500, although other angles are possible and the clip linkage 1000 will function.

The clip linkage 1000 will even function to hold a panel which is an elementary board to ceiling furring or back surface. No corner in the panel is necessary. More information on this is described below in FIGS. 11, 12, and 13.

The panel assembly shown in FIG. 3 comprises a spacer 700 which inserts into a blind hole 554 in the second panel 550 which is around the corner 508. 510 from the first panel 500. The spacer 700 connects the second panel 550 to a second back board 250. The spacer 700 displaces straight in the blind hole 554. The first panel 500 only moves parallel to the first back surface 200. There is no lift and drop of the first panel 500 relative to the second panel. The locking arm 600 of the first clip 900 and second clip 300 which clip together by straight displacement in the longitudinal direction of the locking arms 600, 650.

As can be seen in FIG. 3 the locking arm holder 400, the locking arm 600, and the second clip 300 are intermediate the first panel 500 and the first back surface 202. So the clip linkage is hidden by the panel. Only the finished outwardly facing exposed surface 506 of the first panel 500 can be seen. The first clip 900 is attached by the locking arm holder 400 to a hidden surface 502 of the panel 500. The hidden surface 502 is facing the parallel back surface 202.

Figure 4:
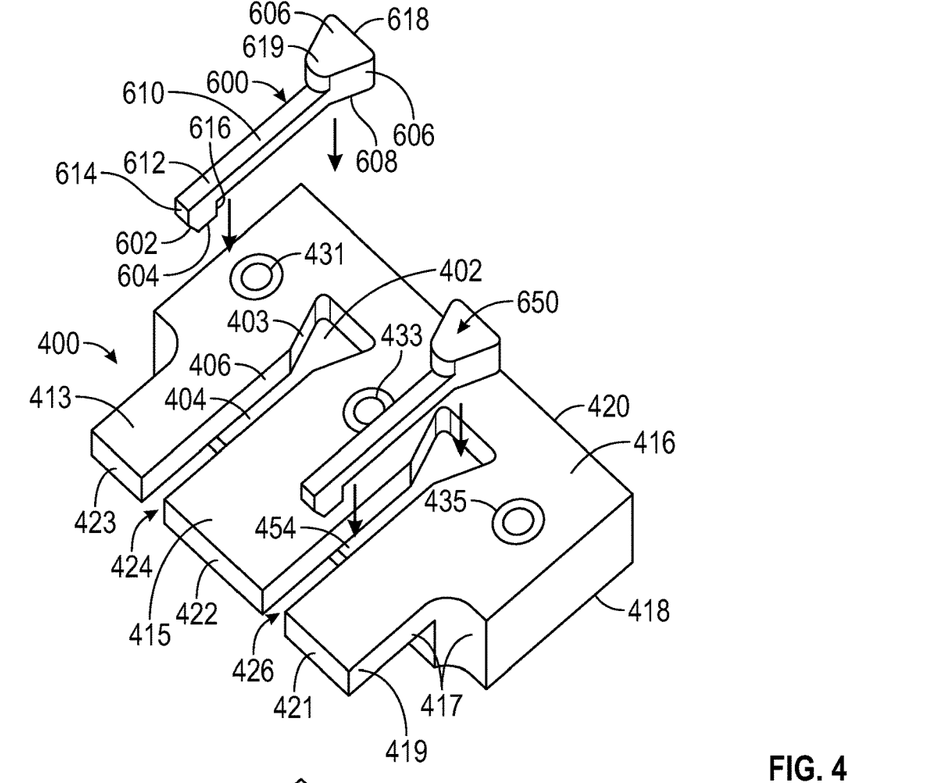
FIG. 4 shows a perspective of a locking arm holder configured to receive two locking arms to form a first clip.
Figure 5:
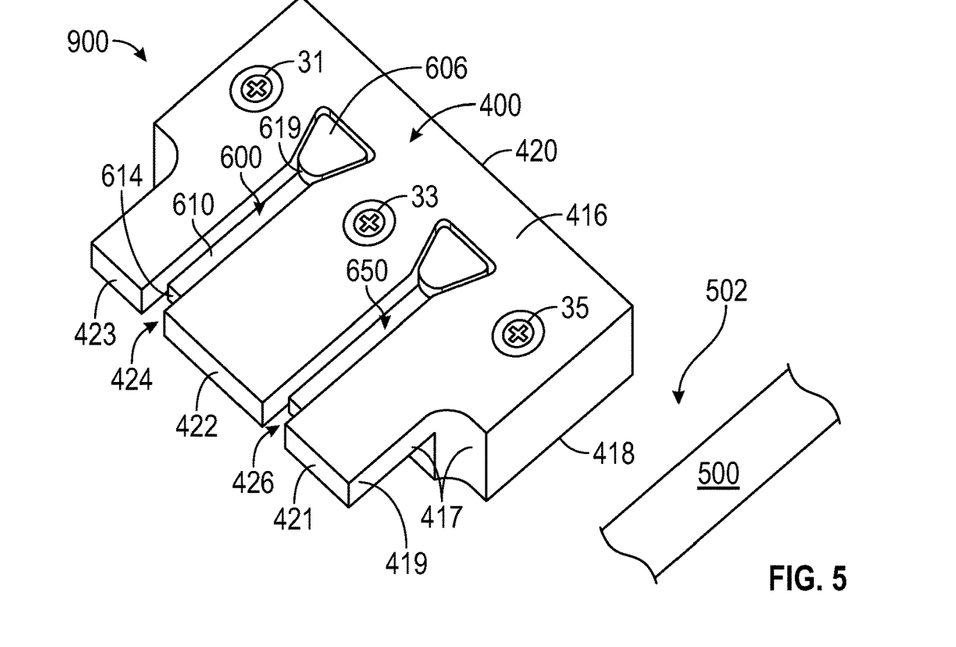
FIG. 5 shows a perspective of the first clip comprising the two locking arms and the locking arm holder.

More detail on the locking arms 600, 650 and the locking arm holder 400 is shown by FIG. 4 and FIG. 5. FIG. 4 shows the locking arm holder 400 before the locking arms 600, 650 are inserted into it. FIG. 5 shows the locking arm holder 400 after locking arms 600, 650 after the locking arms 600, 650 are inserted. A first clip 900 is made by the locking arms in the locking arm holder.

FIGS. 4 and 5 show three overhangs 419 beside the slot side wall 406 of the two slots to receive the locking arms. The overhangs have a weight bearing surface 417 parallel to the attachment surface 418 to the panel 500 and also parallel to the back surface facing surface 416. The weight bearing surface 417 is intermediate the attachment surface 418 and the back surface facing surface 416. The weight bearing surface 417 height from the attachment surface 418 is the same or greater by a sliding clearance than the height of the catch lip 316 of the panel facing surface 312 of the second clip. This positions the weight bearing surface 417 of the overhang 419 to rest on the catch lip 316. The overhangs 419 thus prevent the panel 500 attached to the locking arm holder 400 from falling away from the back surface 202. More detail is provided below with the description of FIGS. 11, 12, and 13.

Returning to FIG. 3, the locking arm holder 400 is attached to the panel 500 by screws 31, 33, 35 through holes 431, 433, 435. As can be seen in FIG. 4, each locking arm 600, 650 is dropped into a mortice 402 and elongate slot 404, 454 in the locking arm holder 400. Before the locking arms 600, 650 are dropped into the elongate slots 404, 454, the panel 500 can be maneuvered into test positions by working persons. The working persons can maneuver the panel 500 into test position without inconvenience of interference of the locking arms 600, 650 bumping into the second clips and accidently locking the panel 500 to the back surface 202 before the working person intended.

Figure 8:
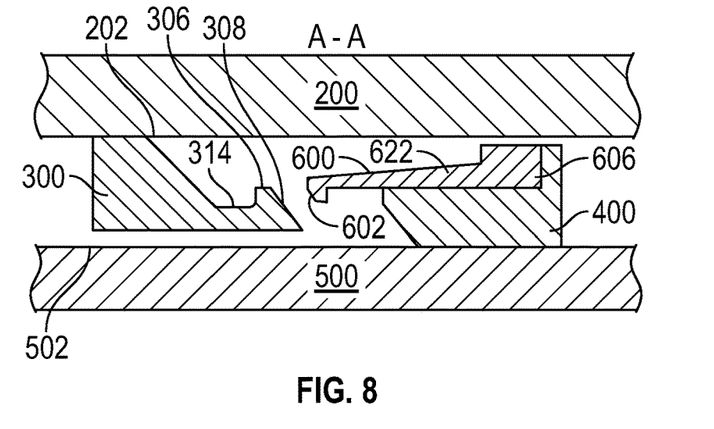
FIG. 8 shows a first cross section through the clip linkage showing the locking arm prior to being clipped to the second clip.
Figure 9:
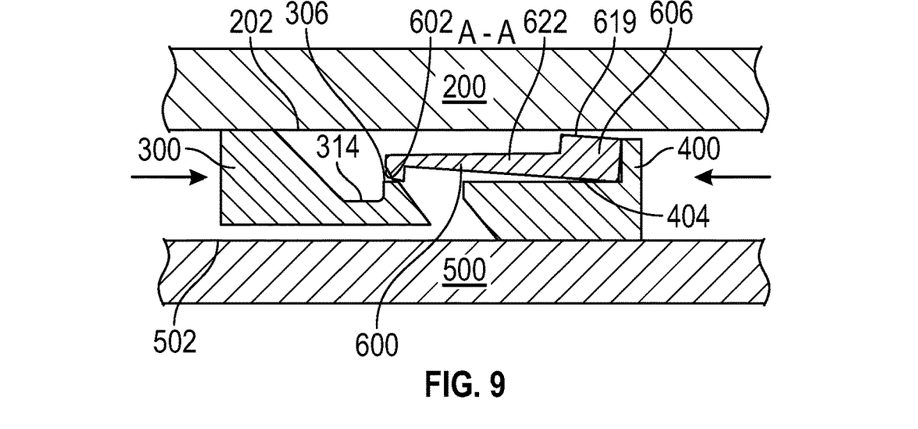
FIG. 9 shows the first cross section through the clip linkage showing the locking arm as clipping to the second clip occurs.
Figure 10:
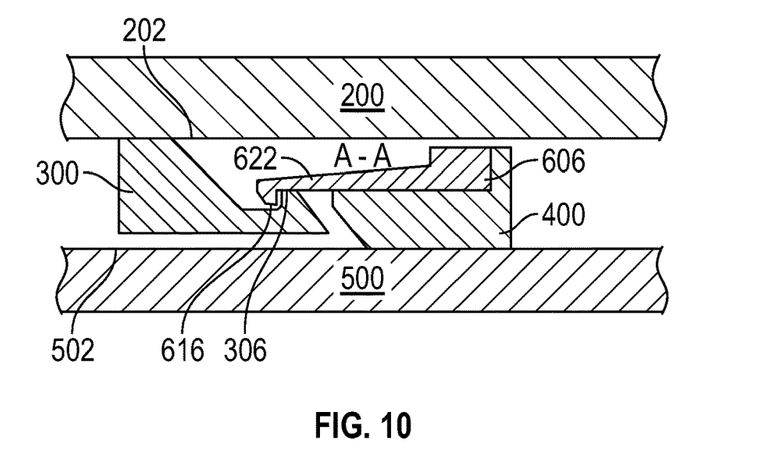
FIG. 10 shows the first cross section through the clip linkage showing the locking arm after being clipped to the second clip.

As shown in FIG. 3 and in FIGS. 8, 9 and 10, the locking arm 600 is inserted in the locking arm holder 400 so that the longitudinal direction of the locking arm 600 is parallel to the hidden surface 502 of the panel 500 and to the back surface 202. The locking arm 600 and held by a tenon 608 at an end of the locking arm 600 distal from a connecting end 614 where the locking arm 600 clips to the second clip 300.

The locking arm 600 has a prong 622 which extends in the longitudinal direction from the tenon 606 to the connecting end 614. The prong 622 comprises a resilient material such as a polymer or alloy. The prong 622 is free to bend resiliently toward and away from the locking arm holder 400 while the tenon 606 is constrained from moving in the mortice 402. The mortice 402 prevents the whole locking arm 600 from moving longitudinally. The tenon 606 is thicker than the prong 622 to encourage the prong 622 to bend preferentially.

Therefore once the locking arm 600 bends to displace the connecting end 614 over the catch 306 of the second clip 300, longitudinal release of the locking arm 600 is prevented from both the locking arm holder 400 and the second clip 300. The first clip 900 and the second clip 300 are clipped together. They cannot be pulled apart in the longitudinal direction of the locking arm 600. The first panel 500 cannot be pulled laterally away from the back surface 202 because the spacer 700 does not allow lateral displacement. This way the first panel 500 and the second panel 550 are securely clipped in a fixed position covering the first back board 200 and the second back board 250. More explanation is provided by a discussion of FIGS. 8, 9, and 10 below.

Figure 6:
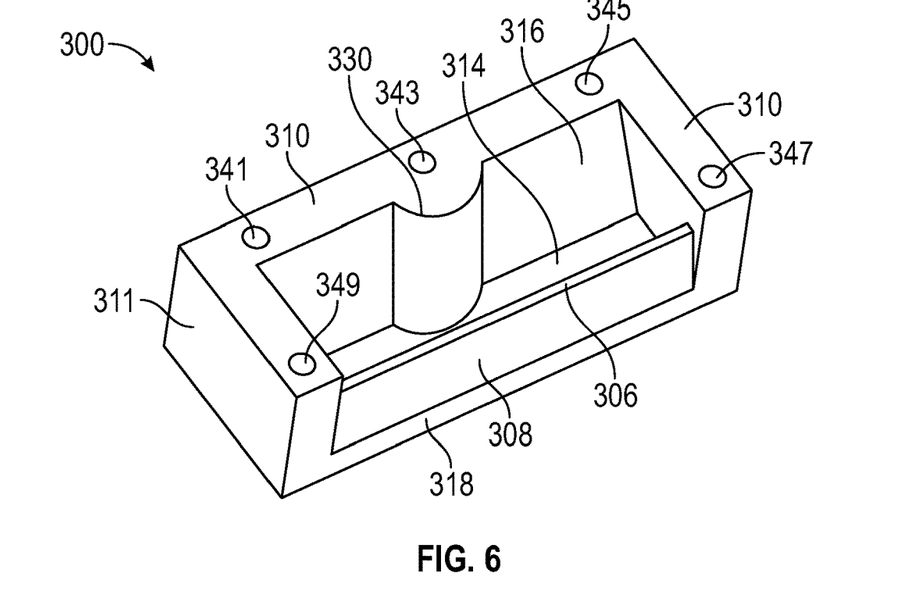
FIG. 6 shows a first perspective of a second clip to attach to the back surface, showing a side of the second clip having a catch to clip to the locking arm.
Figure 7:
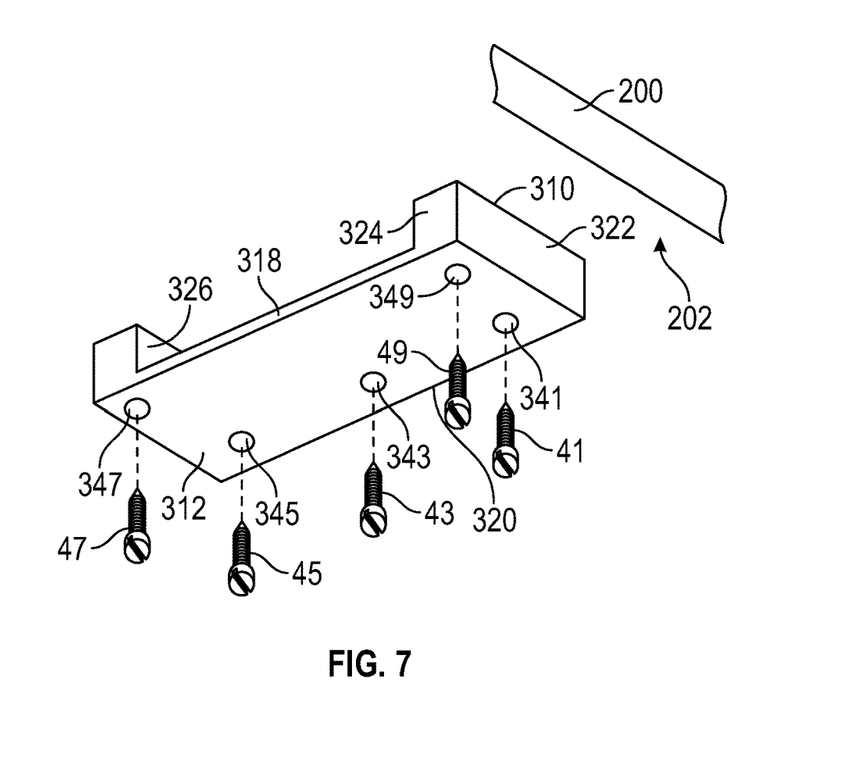
FIG. 7 shows a second perspective of the second clip attached to the back surface.

FIG. 6 and FIG. 7 show the second clip 300 in detail. There are screw holes 341, 343, 345, 347, 349 through the boundary wall 311 around a cavity having a cavity entrance over a lip 306. Screws 41, 43, 45 47, 49 through the screw holes attach an attachment surface around the cavity except the entrance to the back surface 202. This prevents any portion of the boundary wall 311 from being bent away from the back surface by the weight of the panel 500.

The catch 306 can be seen FIG. 6 which shows a perspective of the second clip 300. The catch 306 comprises a leading edge 318. As can be seen in FIG. 3, to connect the looking arm 600 to the second clip 300, the catch is proximate the hidden surface 502 of the panel 500 and normal to the longitudinal direction of the locking arms 600, 650.

As can be seen in FIG. 3 and in FIG. 6 there is a ramp 308 from the leading edge 318 of the entry to the cavity to a lip 306 at end edge of the cavity having a floor 314. The locking arm 600 has a complementary connecting end 614 to fit into and be clipped over the lip 306 into the cavity. From the connecting end 614, there is a slanted surface 602 to a tip of a barb 604. The slanted surface 602 of the locking arm 600 is complementary to the ramp 308 of the second clip 300. So the locking arm 600 is displaced longitudinally toward the ramp 308, the slanted surface 602 slides up the ramp 308 and over the lip 306 into the cavity. The action of sliding the slanted surface 602 up the ramp 308 bends the resilient prong 602 away from the attachment surface 418 of the locking arm holder 400 and toward the back surface 202. The tip 604 snap over the lip 306 as the prong 622 springs back.

FIG. 3 shows the clip linkage set intermediate a back surface 202 and a panel 500 with the locking arm barbed tip 604 caught by a lip 306 of a catch of the second clip 300. The panel 500 covers a wall or a ceiling of a room, shed, cabin, mobile home, elevator, or vehicle. The panel 500 has an exposed surface 506 which can be seen inside a room, shed, cabin, mobile home, elevator, or vehicle. The exposed surface is polished or has another preparation intended to be seen. The panel 500 has a hidden surface 502 which faces the back surface 202 and cannot be seen.

The clip linkage prevents relative parallel displacement of the panel 500 past the back surface 202. The clip linkage comprises the first clip 900 comprising two parallel tines 600, 650 as shown in FIG. 2. In other embodiments the first clip 900 has only one locking arm 600 or has three or more parallel locking arms. The locking arms 600, 650 each have a tenon 606. In FIGS. 1,2, 4 and 5 the locking arms are shown identical in shape size. It is not necessary for the locking arms to have identical shape and size as long at the catch 306 in the second clip 300 is configured to catch and hold the connecting end 614 of each locking arm 600 individually.

The locking arm holder 400 attaches to the first panel 500 to present at least one mortice 402, 452 in the locking arm holder 400 to receive the tenon 606 of each of the locking arms 600, 650. The mortice 402 has an entrance to receive the tenon 606 opposite to an attachment surface 418 of the locking arm holder 400 which is attached to the panel 500 by attaching screws 31, 33, 35. Attachment of the locking arm holder 400 to the panel 500 directs the entrance to the mortice 402, 452 outward from the first panel 500. The locking arms 600, 650 can be dropped simply and quickly into the locking arm holder 400 when the locking arm holder is attached to the panel 500 by dropping the tenon 606 into the mortice 402, 452.

With the tenon 606 in the mortice 402, longitudinal displacement of the locking arm 600 parallel to the panel is restricted or prevented depending on the amount of clearance of the tenon 606 in the mortice. The second clip 300 attaches to the back surface 202 and catches a prong 622 of the locking arm 600 extending from the tenon 606. The catch 306, 308 in the second clip 300 prevents longitudinal release of the locking arm 600 from the second clip 300. The first clip 900 and second clip are then clipped together so that the first panel 500 is prevented displacing parallel to the back surface 202 in the longitudinal direction of the locking arm.

As shown in FIG. 2 extending from the mortice is an elongate slot 404 in the locking arm holder to conform to the locking arm elongate shape. The elongate slot has sides 406 to prevent lateral deflection of the locking arm 600, especially the prong 622, parallel to the panel when the locking arm holder is attached. In this way locking arm holder 400 prevents displacement of the panel 500 normal to the longitudinal direction of the locking arms the slots 404, 454 also prevent the panel 500 from rotating parallel to the back surface 202. A second slot 454 for a second locking arm 650 parallel to the first slot 406 reinforces this effect.

The slot 404 has depth from its entrance to its floor greater than a thickness of the locking arm save for the tenon. This is the thickness of the prong 622 from the slot floor contact surface 610 to the to the exposed surface 612. The depth of the slot 404 permit the locking arm 600 the held by the tenon 606 in the mortice 402 to bend away from the panel 500 within the slot 406 when the locking arm holder 400.

The tenon 606 has a thickness from the mortice floor contacting surface 610 to the surface 608 which faces the back surface 202 equal depth of the mortice 402 in locking arm holder 400. This depth stands the tenon 606 held by the mortice 402 flush or proud of locking arm holder.

The first clip 900 comprising the locking arm holder 400 with the locking arms 600, 650 inserted as shown in FIG. 5 has at thickness across the locking arm holder and the locking arm 600 which is the shortest distance between the exposed portion of the tenon 608 and the attachment surface 418 of the locking arm holder 400. This thickness of the first clip 900 is substantially equal to a thickness of the second clip 300 to separate the back surface 200 from the panel 500. This thickness of the second clip is the shortest distance between the attachment surface 310 and the sliding surface 312. The first clip 900 has a maximum thickness across the locking arm 600 held in the locking arm holder 400 in a direction to stand from the panel 500 which exceeds a maximum thickness across the rim 306 and a barbed end 604 of the locking arm 600. This provides space for the barbed end to slide between the rim 306 and the back wall 202 into the cavity 314.

FIGS. 8, 9, and 10 show in three steps how the panel 500 is connected to the back surface 202 by the clip linkage 1000. The locking arm holder 400 is attached to the hidden surface 502 of the panel. The locking arm 400 holds the tenon 606 of the locking arm 600. This hold prevents displacement of the locking arm 600 relative to the locking arm holder 400 in the longitudinal direction of the tine or prong 622. The second clip 300 is attached to the back surface 202 of the ceiling.

FIG. 8 shows the positions of the locking arm holder 400, locking arm 600, and second clip 300 prior to engagement.

FIG. 9 shows their positions as they are engaging. The panel 500 is displaced parallel to the back surface 202 in the longitudinal direction of the tine 622. The locking arm ramp 622 at the tip of the locking arm 600 distal from the tenon 600 bumps into the second clip catch ramp 308. The slant of second clip catch ramp 308 deflects the tip of the locking arm towards the back surface 202 and away from the panel 500. The tip of the locking arm 600 crests the second catch lip 306. Deflection of the tip of locking arm is aided by resilient bending of the locking arm. The tenon surface 619 distal from the slot floor 404 is stopped by the back surface 202 which prevents the locking arm from being pushed out of the locking arm slot.

FIG. 10 shows positions of the locking arm holder 400, locking arm 600, and second clip 300 when they are clipped together. The locking arm barb 616 has crested over the second catch lip 306 and caught in the cavity of the second clip. The locking arm barb 616 cannot escape the cavity by displacement along the longitudinal direction of the tine 622 because of the catch lip 306 and because of the wall 311 of the cavity. The locking arm 600 is prevented from displacing sideways out of the cavity by locking arm holder slot side wall 406. The locking arm is prevented by displacing out towards the back surface 202 by being trapped between the back surface and slot floor 404. The locking arm 600 is trapped so that panel 500 cannot move parallel to the back surface 202.

Figure 11:
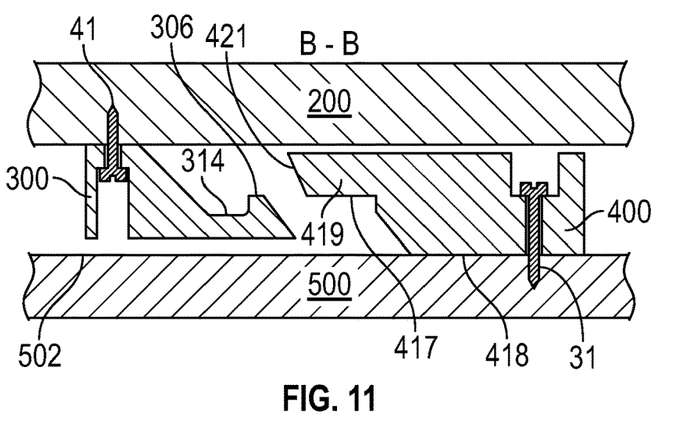
FIG. 11 shows the clip linkage at the same position as in FIG. 8 through a second cross section showing an overhang of the locking arm holder.
Figure 12:
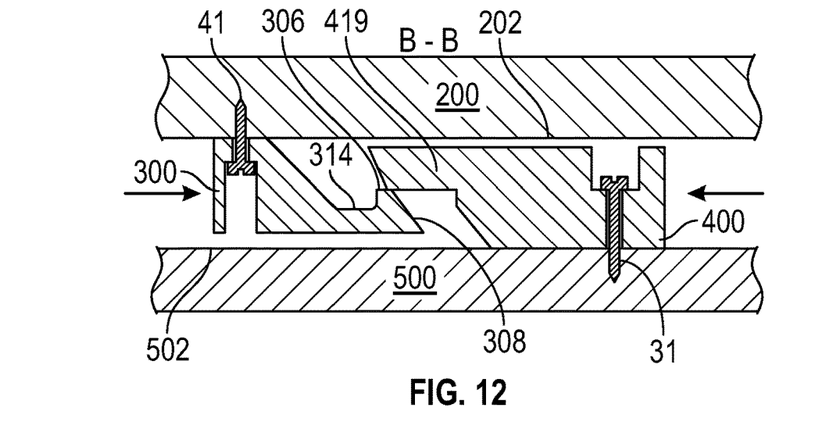
FIG. 12 shows the clip linkage at the same position as in FIG. 9 through the second cross section showing the overhang of the locking arm holder.
Figure 13:
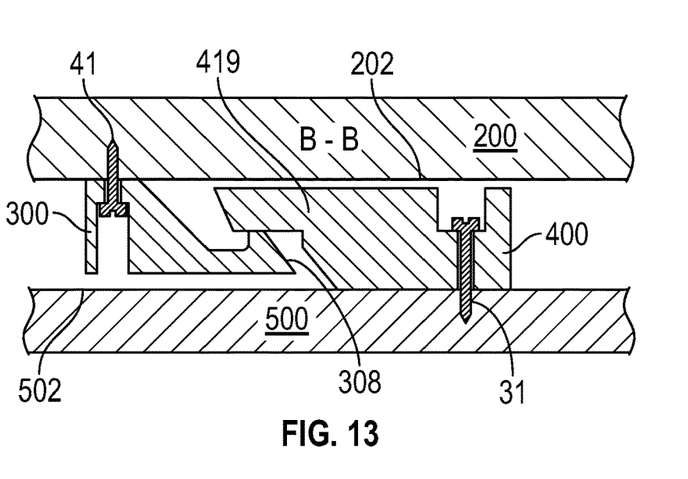
FIG. 13 shows the clip linkage at the same position as in FIG. 10 through the second cross section showing the overhang of the locking arm holder.

FIGS. 11, 12, and 13 show a second cross section B-B of the clip linkage 1000 parallel to the first cross section A-A shown in FIGS. 8, 9, and 10. The positions of the locking arm holder 400 and the second clip in FIGS. 11, 12, and 13 are the same as their positions in FIGS. 8, 9 and 10 respectively.

The overhang 419 is displaced over the second catch lip 306 as the locking arm leading end 614 is clipped by the second catch lip 306. The weight bearing surface 417 of the overhang slips over the second catch lip 306 and rests upon the second catch lip 306. This prevents the panel 500 from dropping away from the back surface 202. Thus the panel is safe overhead because it cannot slide parallel to the back surface to unclip the locking arm from the second clip and the panel cannot fall.

INDEX OF LABELLED FEATURES IN FIGURES

| | |
|---|---|
| Panel assembly . . . | 100 |
| Back board . . . | 200 |
| Back surface . . . | 202 |
| Orthogonal back board . . . | 250 |
| Second clip . . . | 300 |
| Second clip catch lip . . . | 306 |
| Second clip catch ramp . . . | 308 |
| Second clip attachment surface . . . | 310 |
| Second clip sliding surface . . . | 312 |
| Second clip catch cavity floor . . . | 314 |
| Second clip cavity slanted wall . . . | 316 |
| Second clip catch ramp edge . . . | 318 |
| Second clip side . . . | 320 |
| Second clip distal end . . . | 322 |
| Second clip cavity wall end . . . | 324 |
| Second clip cavity side wall . . . | 326 |
| Second clip cavity bumper . . . | 330 |
| Second clip fastening screws . . . | 41, 43, 45 |
| Screw clip fastener holes . . . | 341, 343, 345 |
| Locking arm holder . . . | 400 |
| Locking arm holder mortice . . . | 402 |
| Locking arm holder mortice converging wall . . . | 403 |
| Locking arm holder slot floor . . . | 404 |
| Locking arm holder slot side wall . . . | 406 |
| Locking arm holder back surface facing surface . . . | 416 |
| Locking arm holder attachment surface . . . | 418 |
| Locking arm holder distal end . . . | 420 |
| Locking arm holder slot exit end . . . | 424 |
| Locking arm holder second mortice . . . | 452 |
| Locking arm holder second slot . . . | 454 |
| Locking arm holder fastening screws . . . | 31, 33, 35 |
| Locking arm holder fastener holes . . . | 431, 433, 435 |
| Panel . . . | 500 |
| Panel hidden surface . . . | 502 |
| Panel end . . . | 504 |
| Panel exposed surface . . . | 506 |
| Panel inner corner . . . | 508 |
| Panel outer corner . . . | 510 |
| Orthogonal panel . . . | 550 |
| Orthogonal panel hidden surface . . . | 552 |
| Orthogonal panel blind hole . . . | 554 |
| Orthogonal panel outer surface . . . | 556 |
| Locking arm . . . | 600 |
| Locking arm ramp . . . | 602 |
| Locking arm barb tip . . . | 604 |
| Locking arm tenon . . . | 606 |
| Locking arm tenon exposed portion . . . | 608 |
| Locking arm slot contact surface . . . | 610 |
| Locking arm prong exposed portion . . . | 612 |
| Locking arm leading end . . . | 614 |
| Locking arm barb . . . | 616 |
| Locking arm tenon end . . . | 618 |
| Locking arm exposed surface . . . | 619 |
| Locking arm tenon stand . . . | 620 |
| Locking arm prong . . . | 622 |
| Second locking arm . . . | 652 |
| Spacer . . . | 700 |
| Spacer fastener screw . . . | 51 |
| First clip . . . | 900 |

The invention has been described by way of examples only. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the claims.

The invention claimed is:

1. A clip linkage to be set intermediate a back surface (202) and a panel (500), the clip linkage comprising a first clip (900) and a second clip (300), the first clip (900) comprising a locking arm holder (400) and a locking arm (600) having a tenon (606), the locking arm holder (400) is attachable to the panel (500) to present an entrance of a mortise (402) outward from the panel (500) to receive the tenon (606), whereby the mortise (402) constrains the tenon (606) received in the mortise (402) to restrict displacement of the locking arm (600) parallel to the panel (500), and the second clip (300) is attachable to the back surface (202) and comprises a catch (306, 314) to catch and hold the locking arm (600) to restrict displacement of the panel (500) to be parallel to the back surface (202).

2. The clip linkage according to claim 1 wherein the locking arm holder (400) comprises an overhang (413, 415, 419) beside a first slot (404, 406, 424) that extends from the mortice (402), wherein the first slot (404, 406, 424) and mortice (402) receive the locking arm (600), and the second clip (300) comprises a ledge (306) of the catch (306, 314) for the overhang (413, 415) to rest upon to support a weight of the panel (500).

3. The clip linkage according to claim 1 wherein the locking arm (600) has a prong (622) which extends in a longitudinal direction from the tenon (606) providing the locking arm with an elongate shape, and the catch (306) is configured to catch the locking arm (600) to prevent release in the longitudinal direction of the locking arm (600).

4. The clip linkage according to claim 2 wherein the overhang (413, 415, 419) comprises a weight bearing surface (417) to rest on the ledge (306) to support the weight of the panel.

5. The clip linkage according to claim 1 comprising a spacer (700) connectable to the panel (500) and the back surface (202) to restrict displacement between the panel (500) and back surface (202) to displacement of the panel (500) that is parallel to back surface (202).

6. The clip linkage according to claim 5 wherein the spacer (700) comprises an insert slidable in a groove or a blind hole of the panel (500).

7. The clip linkage according to claim 1 wherein the entrance into the mortise (402) is opposite to an attachment surface (418) on a side of the locking arm holder (400) which attaches to the panel (500).

8. The clip linkage according to claim 1 wherein extending from the mortise (402) is a first slot (404, 406, 424) in the locking arm holder (400), and the mortise (402) and first slot (404, 406, 424) have a shape to receive the locking arm (600).

9. The clip linkage according to claim 8 wherein the first slot (404 406) has a depth greater than a thickness of a prong (622) of the locking arm (600) which extends from the tenon (606), wherein the first slot (404, 406, 426) receives the prong (622).

10. The clip linkage according to claim 8 comprising a second locking arm (650) and a second slot (454) in the locking arm holder (400), wherein the first slot (404, 406) and the second slot (454) are aligned parallel to each hold one of the first and the second locking arms (600, 650) parallel to each other.

11. The clip linkage according to claim 1 wherein the tenon (606) has a thickness from a mortise floor contacting surface (612) distal to an exposed surface (619) of the tenon (606), wherein the thickness is equal to a depth of the mortise (402) to stand the exposed surface (619) flush with a facing surface (416) of the locking arm holder (400) which attaches to the panel (500).

12. The clip linkage according to claim 1 wherein the locking arm (600) has a prong (622) which extends from the tenon (606) to a second end (614) of the prong (622), wherein the prong (622) is resilient to bend away from and then spring back toward the locking arm holder (400) to engage with the catch (306, 314).

13. The clip linkage according to claim 12 wherein the second clip (300) comprises a deflector (308) sloped to the catch (306) to bend the prong (622).

14. A panel assembly comprising: the panel (500) and the clip linkage according to claim 1, wherein the first clip (900) is attached by the locking arm holder (400) to the panel (500).

15. The panel assembly according to claim 14 comprising a spacer (700) displaceable in a groove or blind hole in the panel (500) and connectable to the back surface (202) to restrict relative displacement between a first planar section of the panel (500) and the back surface (202) to parallel displacement.

16. The panel assembly according to claim 15 wherein the panel (500) comprises; the first planar section to which the locking arm holder (400) is attached, and a second planar section (550) angled from the first planar section (500);

wherein the spacer (700) is slidably connected to the second planar section (550).

17. The panel assembly according claim 16 wherein the panel (500) there is a corner (508, 510), and the first planar section (500) is connected the second planar section (550) at the corner.

18. A kit of components comprising the first clip (900) and the second clip (300) of the clip linkage according to claim 1.

19. A room, shed, cabin, mobile home, elevator, or vehicle having a wall or ceiling comprising a panel assembly according to claim 14.

20. A method of setting the clip linkage according to claim 1, comprising: attaching the first clip (900) to the panel (500) by attaching the locking arm holder (400) to the panel (500) to present an entrance of the mortise (402) outward from the panel (500) to be accessible by the tenon (606), receiving the tenon (606) in the mortise (402), attaching the second clip (300) to the back surface (202), and displacing the panel (500) parallel to the back surface (202) until the catch (306, 314) of the second clip (300) catches the locking arm (600, 650).

* * * * *